United States Patent [19]

Harris

[11] Patent Number: 5,782,007

[45] Date of Patent: Jul. 21, 1998

[54] TOOL GUIDING TAPE MEASURE

[76] Inventor: Adam S. Harris, 1946 Meadows Rd., Walnut Creek, Calif. 94595

[21] Appl. No.: 916,505

[22] Filed: Aug. 22, 1997

Related U.S. Application Data

[63] Continuation of Ser. No. 606,967, Feb. 26, 1996, abandoned.

[51] Int. Cl.⁶ ................................................... B43L 9/04
[52] U.S. Cl. .......................... 33/768; 33/27.03; 33/27.32; 33/42; 33/770
[58] Field of Search ............................. 33/768, 27.01, 33/27.02, 27.03, 27.031, 42, 41.6, 758, 759, 760, 767, 770

[56] References Cited

U.S. PATENT DOCUMENTS

| | | | |
|---|---|---|---|
| 2,349,670 | 5/1944 | Moxey | 33/27.03 |
| 2,651,843 | 9/1953 | Goodford | 33/27.03 |
| 2,804,688 | 9/1957 | Kultbner | 33/27.01 |
| 2,934,827 | 5/1960 | Barto | 33/27.03 |
| 3,089,245 | 5/1963 | Cromer et al. | 33/27.03 |
| 3,269,015 | 8/1966 | Barker | 33/767 |
| 3,651,574 | 3/1972 | Burkart | 33/760 |
| 4,255,856 | 3/1981 | Mackie | 33/42 |
| 4,890,393 | 1/1990 | St. Jean | 33/768 |
| 4,976,037 | 12/1990 | Hines | 33/27.03 |
| 5,103,566 | 4/1992 | Stebe | 33/27.03 |
| 5,253,421 | 10/1993 | Landmark | 33/768 |
| 5,390,425 | 2/1995 | Gilberts | 33/768 |
| 5,406,711 | 4/1995 | Graham | 33/42 |

*Primary Examiner*—Christopher W. Fulton
*Attorney, Agent, or Firm*—Harris Zimmerman

[57] ABSTRACT

A guide facilitates marking or cutting flat sheet material, such as wallboard or plywood for example, along linear or arcuate lines. A first guide member has a flat surface which is contacted with an edge of the material. A swivelable guide member is pivoted to the first guide member and carries a tape measure having a housing containing a coiled measuring tape that can be drawn outward from the housing. An implement receiver at the end of the tape has an opening sized to receive a marking pencil, scribe or the like and a slit opening sized to receive a knife or scoring tool blade. A clamp immobilizes the tape relative to the tape housing at any selected degree of extension from the housing. Linear markings or cuts, parallel to an edge of the material, are made by traveling the guide member assembly along the edge while simultaneously traveling the implement receiver along a parallel path. Pivoting the swivelable member relative to the first member enables marking of lines at any selected angle relative to an edge of the material. The first guide member can be temporarily secured to the material to enable marking or cutting of arcs by pivoting the swivelable member relative to the first member.

20 Claims, 5 Drawing Sheets

TOOL GUIDING TAPE MEASURE

This is a continuation of application Ser. No: 08/606,967, now abandoned having the same title and which was filed on Feb. 26, 1996.

TECHNICAL FIELD

This invention relates to tools for facilitating the cutting of flat sheet materials and more particularly to tools having an implement receiver at the end of a measuring tape for guiding a pencil, scribe, cutting blade or the like along linear or arcuate paths of travel on the flat sheet material.

BACKGROUND OF THE INVENTION

Various types of flat structural material are manufactured in the form of flat sheets of standardized dimensions. Sheetrock, gypsum board, plywood and cement backer board are among other examples of materials of this kind. It is often necessary to cut the sheet material in order to fit it into an area where it is to be installed and which has dimensions that differ from those of the sheet material as manufactured. The path of the cut is usually linear and parallel to an edge of the sheet but may on occasion have a different configuration and/or orientation.

One known type of guide for facilitating cutting operations of the above described kind includes a tape measure having a housing containing a coiled measuring tape which may be drawn outward from housing for a selected distance and then be temporarily locked at that degree of extension from the housing. An implement receiver at the distal end of the tape has an opening for receiving a pencil or cutting attachment. Straight lines, parallel to an edge of sheet of material, may be marked on the sheet by drawing the tape measure housing along the edge while simultaneously traveling the implement receiver with pencil along a parallel path which is established by keeping the tape taut during the travel. The sheet may be cut, without any preliminary marking of a cut line, if a cutting attachment is substituted for the pencil.

Prior tool guiding tape measures of this general kind are variously subject to operational limitations that restrict or complicate their use. The prior devices assist in scribing lines that are parallel to an edge of the sheet of material but are not particular suited for scribing lines that intersect the edge at any selected angle. Prior devices rely on the built-in internal tape lock of the tape measure to hold the tape at a selected degree of extension from the tape measure housing during use. The internal tape locks often do not provide a sufficiently strong locking action and such locks may be inadvertently disengaged during use by the operator's hand movements. Prior devices of this kind which alternately enable both scribing of a line or actual cutting along a line require specialized cutting attachments. Some prior devices of this kind enable marking or cutting along an arcuate line by providing a pointed pilot pin on the base of the tape measure housing to enable the device to be used in the manner of a drawing compass. Maintaining the pilot pin at a single fixed point during use can be taxing to the operator. The device does not enable marking or cutting an arc which has a radius greater than the span of the user's outspread arms.

The present invention is directed to overcoming one or more of the problems discussed above.

SUMMARY OF THE INVENTION

In one aspect the present invention provides a tool guide for facilitating movement of an implement along a predetermined path of travel on a flat sheet of material. The tool guide includes a tape measure which has a housing with a coiled measuring tape therein which tape has a distal end that may be drawn outward from the housing. An implement receiver at the distal end of the measuring tape maintains a marking, scribing or cutting implement at a constant distance from the housing as the implement is moved along the path of travel. The tool guide further includes a first guide member having a surface which may be contacted with an edge of the sheet of material and a swivelable guide member which is attached to the first guide member by a pivot. The pivot is oriented to enable pivoting of the swivelable guide member relative to the first guide member about a pivot axis which is perpendicular to the sheet of material when the first guide member is disposed against the edge of the sheet. The tape measure housing is supported by the swivelable guide member and pivots therewith.

In another aspect of the invention, a tool guide for facilitating movements of an implement along linear paths of travel and along arcuate paths of travel on flat sheets of material includes an angled first guide member having a flat first arm for disposition against a marginal region of a flat sheet of material. A second arm of the first guide member has a flat surface for disposition against an edge of the flat sheet of material which flat surface extends at right angles to the first arm of the guide member. A swivelable guide member overlays the flat first arm of the first guide member. A pivot axle couples the first guide member and the swivelable guide member and has a pivot axis that extends at right angles to the flat first arm of the first guide member. The tool guide further includes a tape measure having a housing containing a measuring tape with a distal end that may be drawn outward from the housing through an opening in the housing, the housing being secured to the swivelable guide member. An implement receiver is engaged by the distal end of the measuring tape and has at least one implement receiving opening.

The invention greatly facilitates the cutting of flat sheet materials into pieces of desired shape in part by extending the capabilities of tool guiding tape measures and in part by assuring that marking lines or cuts follow the desired path. The tape measure is pivotable relative to its support and lockable at any desired angular orientation. This enables marking of lines that extend at any desired angle relative to an edge of the sheet of material in addition to marking of lines which are parallel to an edge. An arcuate mark or cut may be made with assurance that it is of desired radius and centered throughout on a single fixed point. In the preferred form of the invention, a tape clamp assures that the tape remains of constant length during marking or cutting operations. Conversion of the device from a marking mode of operation to a cutting mode can be effected with a commonly available form of knife rather than a cutting attachment of specialized design.

The invention, together with further aspects and advantages thereof, may be further understood by reference to the following description of the preferred embodiment and by reference to the accompanying drawings.

BRIEF DESCRIPTION OF THE DRAWINGS

FIG. 10 is a section view taken along line 10-10 of FIG. 8 and which depicts mechanism for locking certain components at a selected angular orientation.

DETAILED DESCRIPTION OF THE PREFERRED EMBODIMENT

Figure 1:
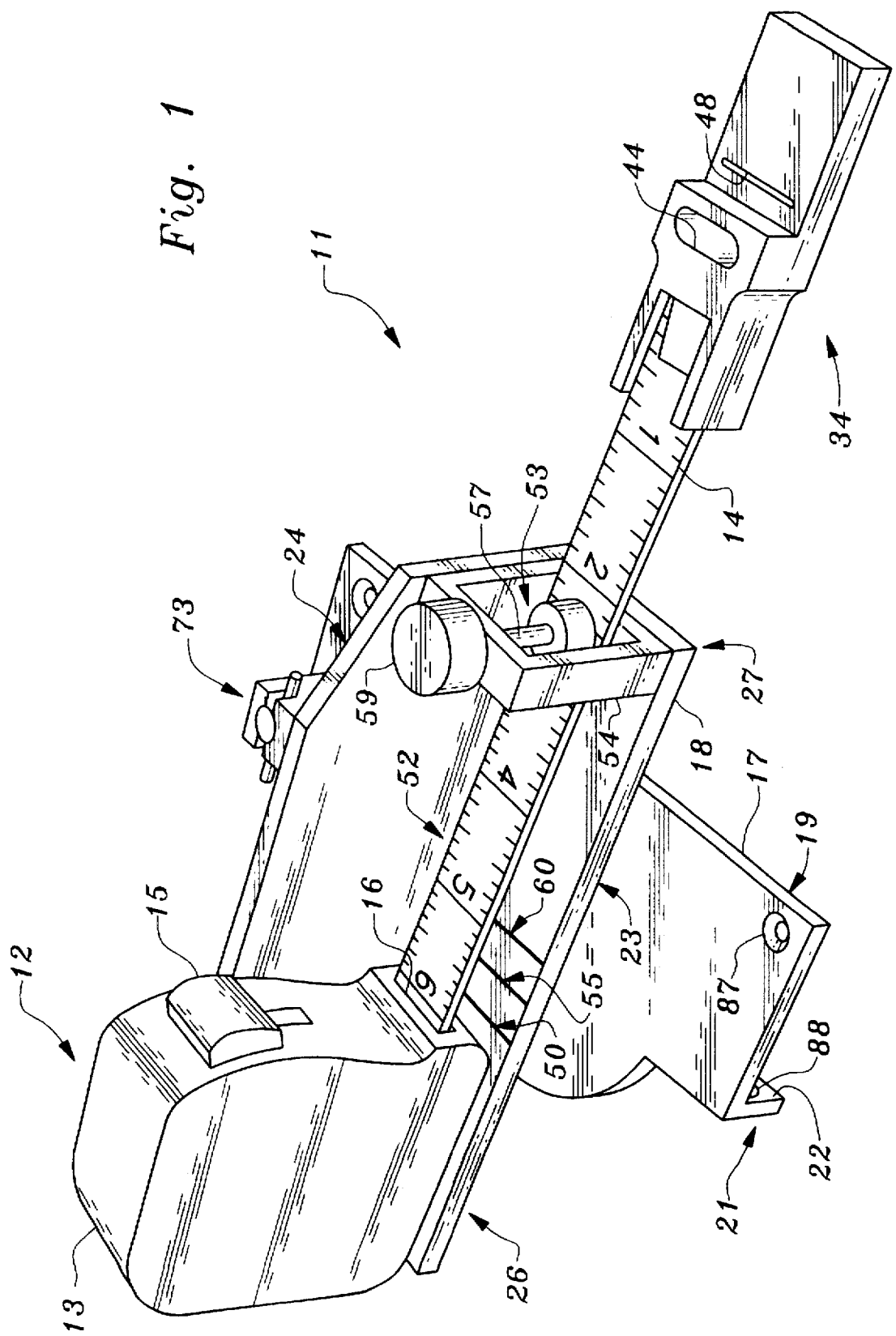
FIG. 1 is a perspective view of a tool guiding tape measure embodying the invention.

Referring initially to FIG. 1 of the drawings, a tool guiding tape measure device 11 in accordance with this embodiment of the invention includes a tape measure 12 of the type which has a housing 13 containing a coiled flexible measuring tape 14 which may be drawn outward from the housing through an opening 16 at the front of the housing. Within housing 13 the tape 14 is wound upon a coil spring (not shown) which retracts the tape back into the housing when the extended end of the tape is released unless a locking button 15 has been actuated by an operator. The internal components of tape measure 12 may be of one of the constructions well known to the art and therefore will not be further described.

Figure 2:
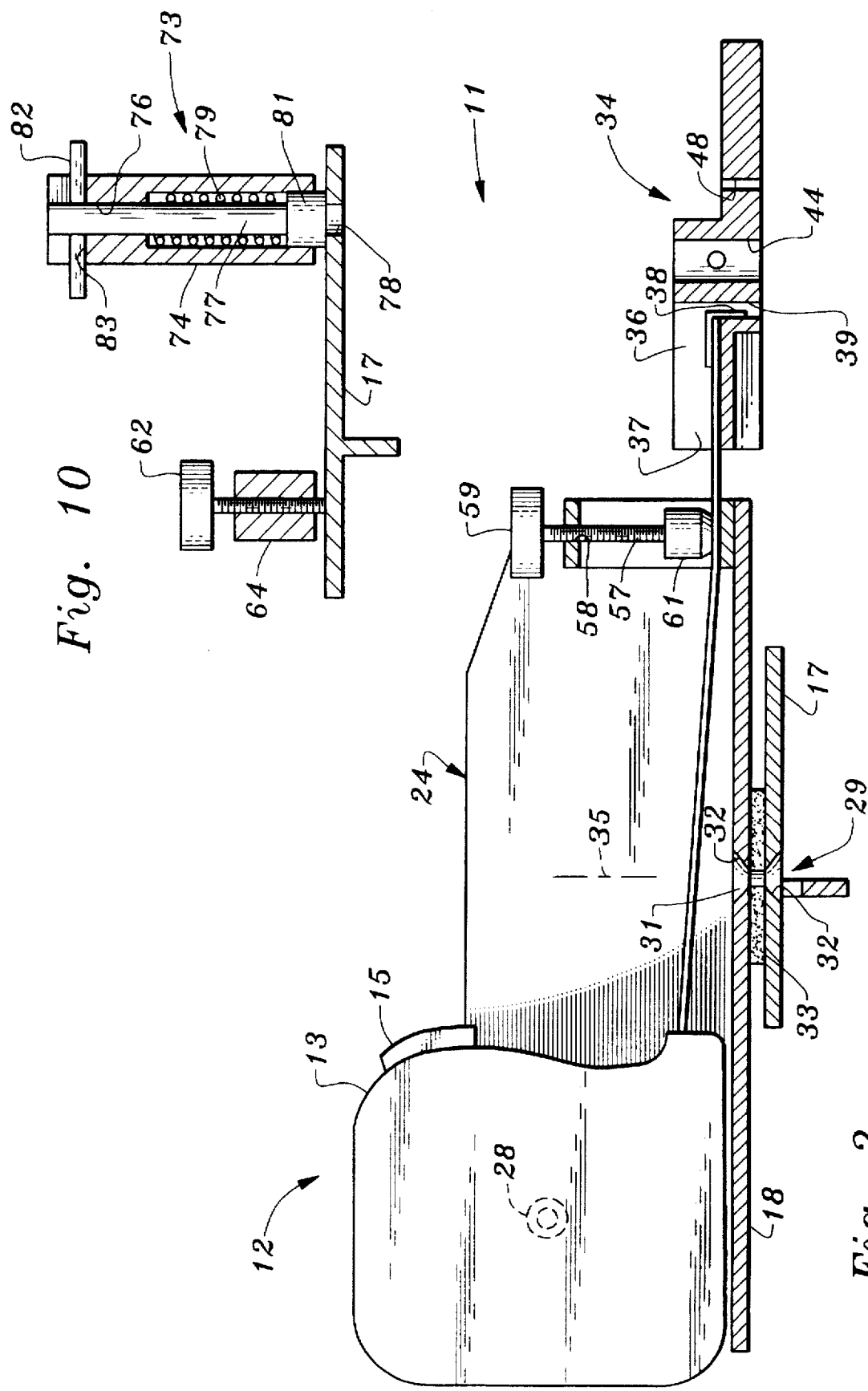
FIG. 2 is an elevation section view of the apparatus of FIG. 1.

A first guide member 17 supports a swivelable guide member 18 to which the tape measure 12 is secured. Referring jointly to FIGS. 1 and 2, the first guide member 17 is angled to have a flat first arm 19 for disposition against a marginal region of a sheet of flat material and a second arm 21 with a flat abutment surface 22 that extends at right angles to first arm 19 and which is disposed against an edge of the sheet of material during use. The swivelable guide member 18 is also right angled and has a flat base 23 which overlays the first arm 19 of the the first guide member 17 and a wall portion 24 which extends upward from one edge of the base. Tape measure 12 is secured to the wall portion 24 at the back end region 26 of swivelable guide member 17 in an orientation at which tape 14 extends towards the front end 27 of the guide member.

Attachment of the tape measure 12 to the swivelable guide member 18 can be effected by using a pre-existing belt clip retainer screw 28 that is found at the center of a side wall of a common form of tape measure. The belt clip is removed and the screw 28 is penetrated through wall portion 24 and reinstalled on the tape measure 12.

Referring to FIG. 2 in particular, swivelable guide member 18 is joined to the first guide member 17 by a pivot 29 which in this example is formed by a pivot axle 31 that extends through oppositely tapered passages 32 in the two members, the pivot axle having tapered ends which conform with the passages in order to retain the pivot axle in place. The pivot axle 31 can be formed by inserting an ordinary screw into the passages 32 and thereafter deforming the narrow end of the screw. Preferably, an annular washer 33 is disposed between the two guide members 17 and 18 in coaxial relationship with pivot axle 31.

Pivot axle 31 is positioned to provide a pivot axis 35 which extends at right angles to first arm 19 of the first guide member 17 and which lies in the plane of the abutment surface 22 of that guide member.

Referring again to FIGS. 1 and 2 in conjunction, an implement receiver 34 is engaged by the distal end 36 of measuring tape 14 preferably in a manner which enables disengagement of the receiver. For this purpose, the distal end 36 of the tape 14 extends into a groove 37 at the back end of receiver 34 and the right angled tab 38 which is secured to the end of tapes of this kind is hooked into a slot 39 in the receiver that extends at right angles to the groove 37. This form of engagement of the tape 14 and receiver 34 enables use of a user's pre-existing tape measure 12 in the device 11 and facilitates replacement of the tape measure if the tape 14 breaks or it otherwise becomes defective.

Figure 4:
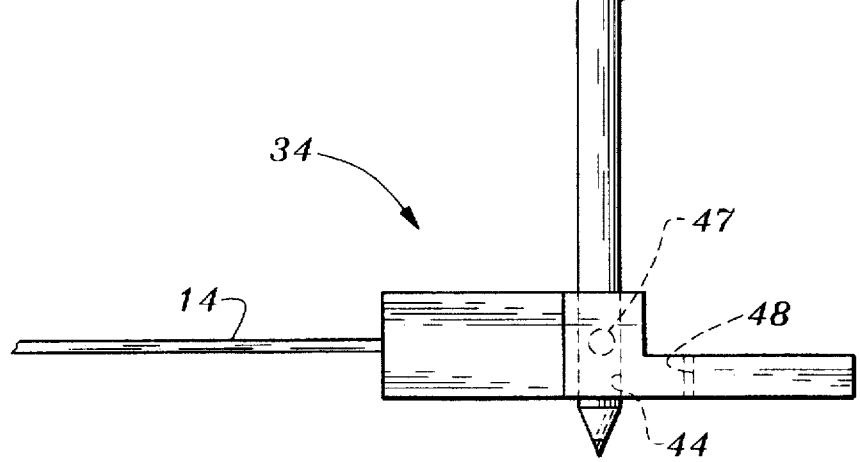
FIG. 4 is a side view of an implement receiver component of the apparatus of the preceding figures.

Referring jointly to FIGS. 1 and 4, implement receiver 34, preferably formed of plastic, has a first opening 44 through which a pencil 46 may extend in order to contact a sheet of material on which a cut line is to be drawn, the opening being oriented to hold the pencil at right angles to tape 14. The first opening 44 is elongated in a direction transverse to tape 14 in order to enable use of flat carpenter's pencils as well as pencils of round cross section. The pencil 46 can be replaced with various other marking tools such as a pen or a scoring or scribing tool for example.

Figure 5:
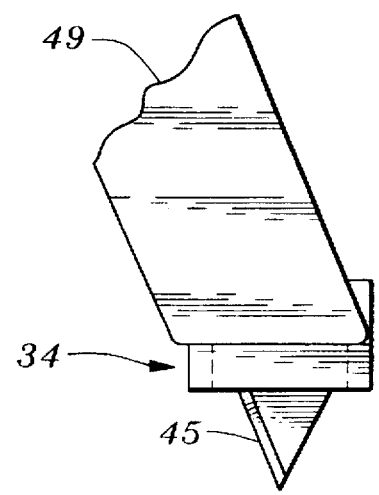
FIG. 5 is an end view of the implement receiver component of FIG. 4 illustrating conversion of the device from a marking mode of operation to a cutting mode of operation.

Referring jointly to FIGS. 1 and 5, the device 11 may be used to cut sheets of material by replacing the above described pencil with a knife blade 45. For this purpose the receiver has a second opening 48 which is a thin slit that extends transversely relative to the tape 14. In the preferred form the slit is sized to receive the blade 45 of a utility knife 49 of the kind commonly found in tool kits and is preferably slightly wider than such blades to enable replacement of the knife with a scoring tool of the known kind which has a slightly wider configuration.

Figure 6:
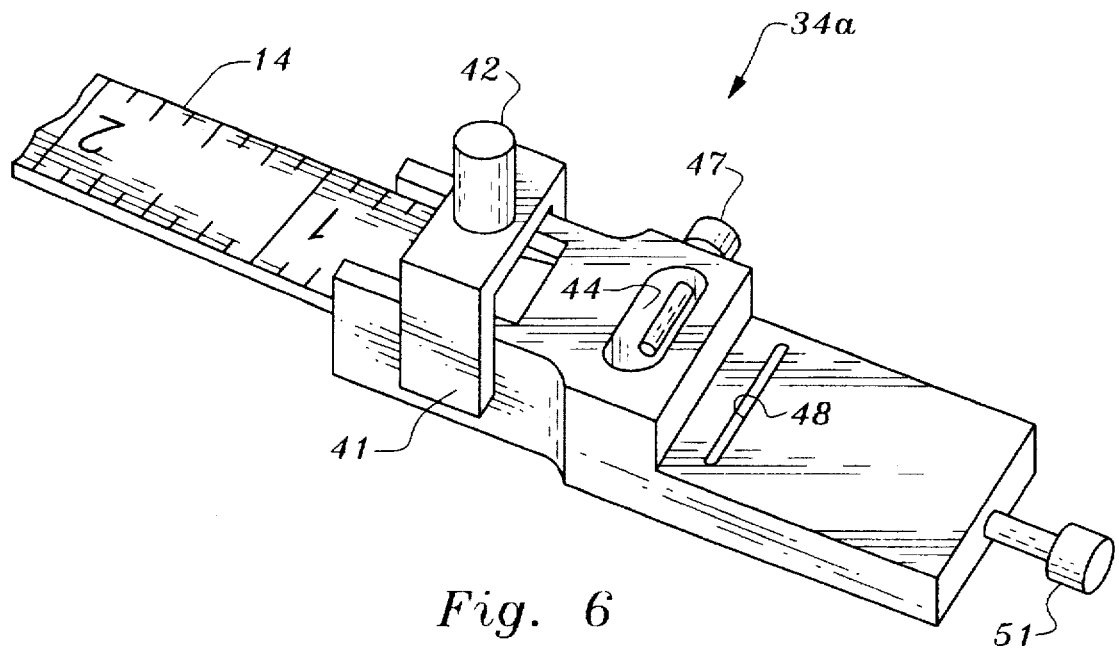
FIG. 6 is a perspective view of an alternate form of the implement receiver component.
Figure 7:
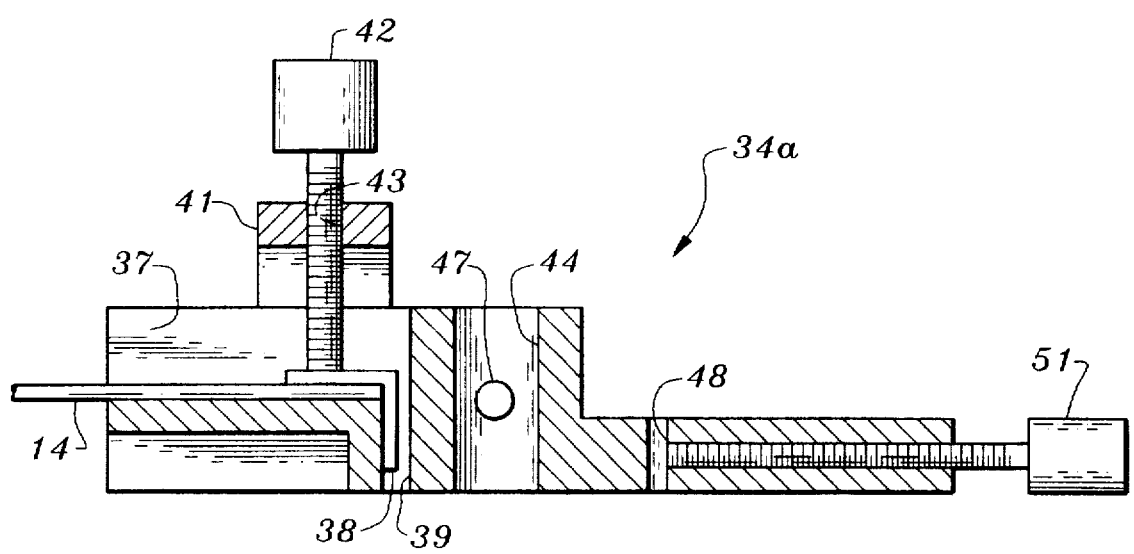
FIG. 7 is a section view of the implement receiver component of FIG. 6.

FIGS. 6 and 7 depict a modification of the implement receiver 34a which enables clamping of the receiver to the end of tape 14 and clamping of the pencil, knife or the like to the receiver. In this modification the previously described groove 37 is spanned by a bridge portion 41 of the receiver 34a. A tape retainer thumbscrew 42 is engaged in a threaded passage 43 in the bridge 41 portion in position to bear against the end of the tape 14 and thereby hold tab 38 in slot 39. The tape 14 can be disconnected from implement receiver 34a by turning thumbscrew 42 to retract it from the tape. Another thumbscrew 47 extends into the pencil receiving opening 44 from a side of the implement receiver 34a to clamp the pencil thereto. A knife blade retainer thumbscrew 51 extends to the knife blade receiving opening 48 from the end of the receiver 34a to clamp the knife blade in place. Except as herein described the implement receiver 34a may be similar to the receiver 34 previously described with reference to FIGS. 1, 2 and 4.

Referring again to FIGS. 1 and 2, tape measure housing 13 is preferably spaced apart from the pivot axis 35 of the device 11 by a distance which is at least equal to and preferably slightly greater than the spacing of the knife blade receiving opening 48 from the end of measuring tape 14. This enables a reading of the distance of a pencil or knife from the edge of a sheet of material without requiring arithmetical calculations to compensate for the spacing of the pencil opening 44 or knife opening 48 from the end of the tape 14. The tape measure housing 13 of this example of the invention is spaced from the pivot axis 35 by a distance slightly greater than the spacing of knife opening 48 from the end of tape 14. A first marking 50 on swivelable guide member 18 in proximity to the tape 14 is located to register with the length marking 52 on the tape that is indicative of the distance of the knife opening 48 from pivot axis 35. A second marking 55 registers with the length marking 52 that is indicative of the distance of the pencil opening 44 from the pivot axis 35. A third marking 60 gives a visual indication of the location of the pivot 29 which is concealed by the tape 14. The markings 50, 55 and 60 are preferably identified by labels such as the words "knife", "pencil" and "pivot" or by abbreviations thereof.

The first marking 50 can be eliminated if the spacing of tape measure housing 13 from pivot axis 35 is equal to the spacing of knife opening 48 from the end of tape 14. Under that condition the length marking 52 of the tape 14 that is at the tape entry and exit opening 16 of the tape measure housing provides an accurate indication of the distance of a knife from the pivot axis 35.

During marking of lines or during cutting of a sheet of material it is usually desirable that the length of the tape 14 that is outside of the tape measure housing 13 remain constant. The built in lock 15 of the tape measure may not be reliable for this purpose. The lock 15 may not have a sufficiently strong locking action and it is also usually at a location where it may be inadvertently disengaged by the user's hand motions during operation of the present invention. To provide a more positive assurance against release of additional tape 14 from housing 13 during marking or cutting operations, tape clamping means 53 are provided at the front end 27 of the swivelable guide member 18. The tape clamping means in this example includes a rectangular frame 54 secured to the front end 27 of the swivelable guide member 18 which forms a window 56 through which the tape 14 extends. A threaded rod 57 is engaged in a threaded passage 58 in the top of frame 54 and extends towards the tape. A thumbwheel 59 at the upper end of rod 57 enables turning of the rod to cause the lower end of the rod to exert clamping pressure against the tape 14. This prevents any withdrawal of additional tape 14 from housing 13 or retraction of tape into the housing until such time as the user turns thumbwheel 59 to retract rod 57 and thereby release the tape. A cushion 61 secured to the bottom of rod 57 is broader than the rod and serves to prevent deformation of the tape and abrasion of the markings 52 of the tape.

Other forms of tape clamping means 53 can be substituted for the threaded rod 57 and thumbwheel 59 such as a cam lock or a push button type of clamping mechanism for example.

Figure 8:
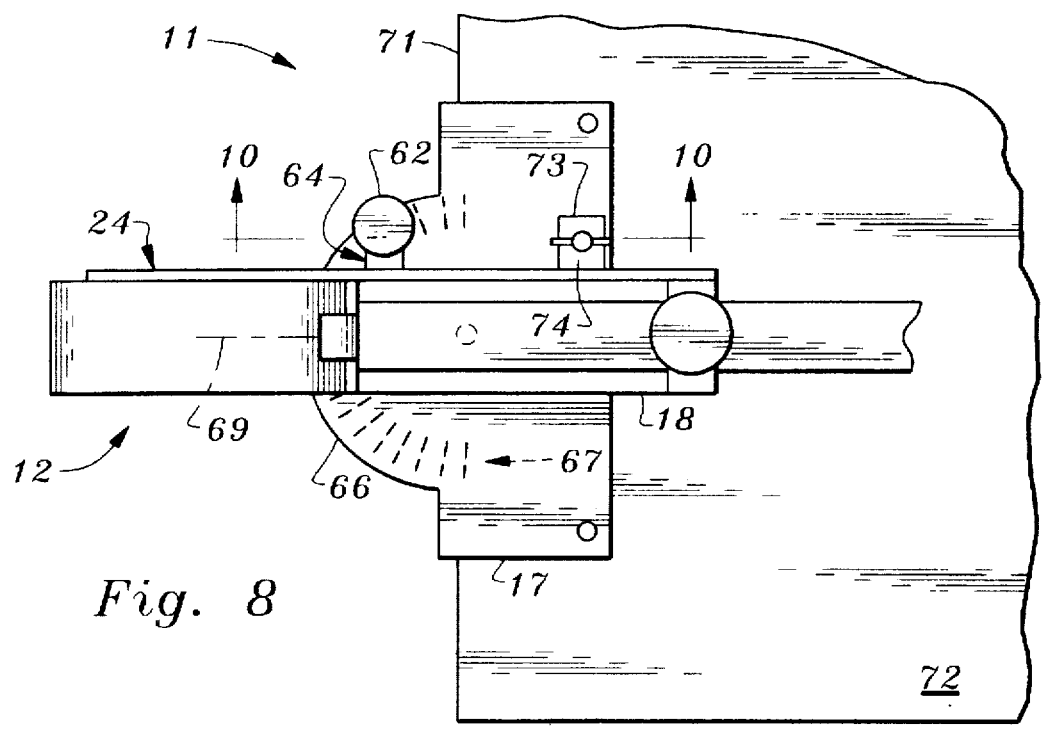
FIG. 8 is a first top view of the apparatus of the preceding figures except for the implement receiver component which is not visible in the figure.
Figure 9:
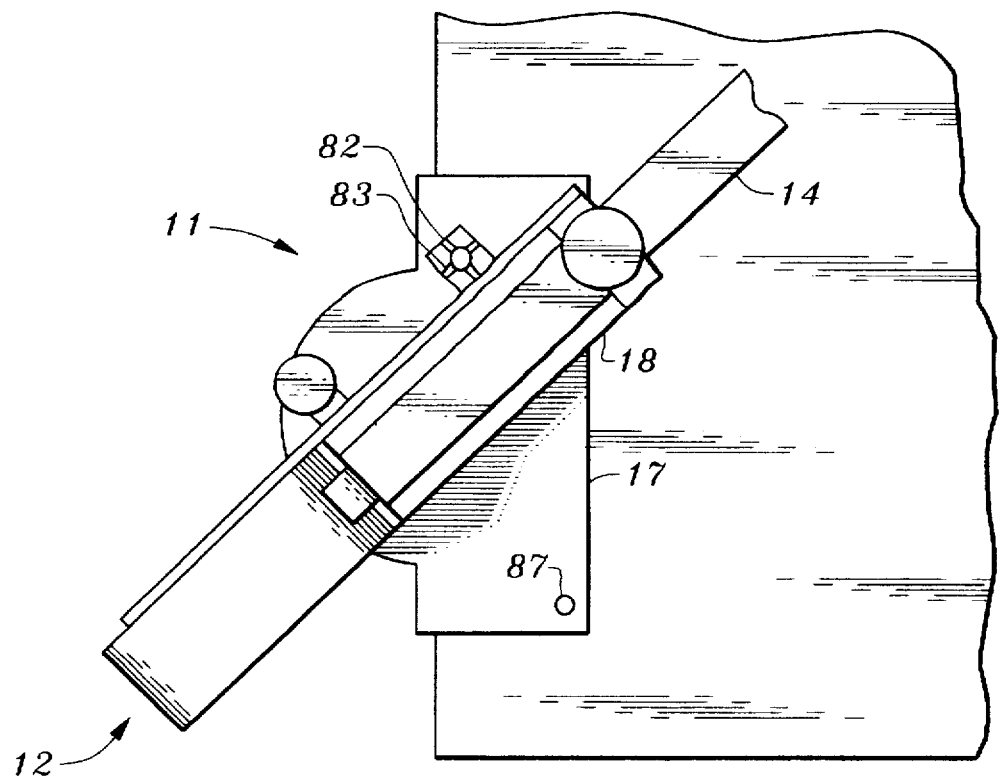
FIG. 9 is a second top view corresponding to FIG. 8 except that certain components are shown with a changed angular orientation.

Referring jointly to FIGS. 8, 9 and 10, the swivelable guide member 18 may be pivoted into any desired angular orientation relative to the first guide member 17 within a 180° arc. To lock the swivelable guide member 18 at a selected angular orientation, a threaded thumbscrew 62 engages in a threaded passage 63 of an arm 64 which extends sidewardly from the wall portion 24 of the guide member 18. The thumbscrew 62 and passage 63 are directed towards a semicircular shelf 66 at the back of first guide member 17. Thus turning of the thumbscrew 62 causes it to exert pressure against shelf 66 and thereby immobilize the two guide members 17 and 18 relative to each other. An arc of protractor scale markings 67, centered on the pivot axis of pivot 29, is situated on the underside of shelf 66 to identify successive angular orientations of the swivelable guide member 18. A linear mark 69 on the underside of the back portion 26 of swivelable guide member 18 is located to register with the appropriate one of the protractor markings 67 at successive angular orientations of the member.

The most common orientation of the swivelable guide member 18 during use is a right angled relationship with the first guide member 17 and thus with an edge 71 of the sheet of material 72 that is being marked or cut. A releasable latch 73 facilitates positioning of the swivelable member 18 at this orientation. Referring jointly to FIGS. 8 and 10, latch 73 has a housing 74 which projects from wall portion 24 of the swivelable guide member 18 and which has a stepped interior passage 76 that is directed towards the first guide member 17. A rod 77 extends within passage 76 and has a lower end which seats in a conforming opening 78 in the first guide member 17 when the guide members 17 and 18 are at right angles with each other. A helical compression spring 79 within the larger diameter region of passage 76 acts against a flange 81 on rod 77 to urge the rod towards the first guide member 17. Thus rod 77 snap engages in opening 78 when the guide members 17 and 18 are brought into an orthagonal relationship. A cross bar 82 extends through the outer end of rod 77 and seats in notches 83 in the end of housing 74 when the rod is seated in opening 78.

Cross bar 82 is lifted out of notches 83 by the user when it is desired to unlatch the swivelable guide member 18 in order to turn it to an angular orientation other than the 90° orientation. The cross bar 82 can then be turned a small amount as shown in FIG. 9 to prevent re-entry of the cross bar into notches 83 at times when it desired to disable the automatic latching feature.

Figure 3:
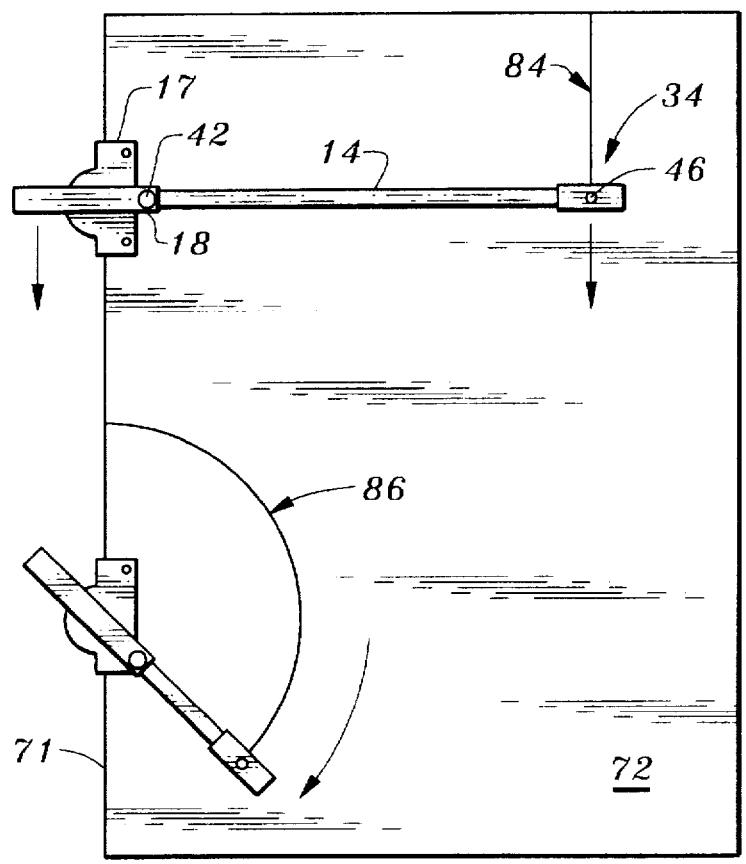
FIG. 3 is a diagrammatic plan view of a sheet of flat material illustrating usage of tool guiding tape measures of the type shown in the preceding figures.

In operation, with reference to FIG. 3, a straight line 84 that is parallel to an edge 71 of a flat sheet of material 72 is drawn by abutting first guide member 17 against the edge in the previously described manner. Implement receiver 34 is drawn away from the edge 71 until measuring tape 14 indicates that the pencil 46 or the like is the desired distance away from edge 71. Thumb wheel 59 is then turned to clamp the tape 14 in the previously described manner and thereby maintain it at a constant length during the marking operation. The guide members 17 and 18 assembly is then traveled along edge 71 while simultaneously traveling implement receiver 34 including pencil 46 along a parallel path of travel and while maintaining tape 14 in a taut condition.

The sheet of material 72 may be cut along a line 84 parallel to an edge 71 by a similar series of operations except that the pencil 46 is replaced by a knife or knife blade in the previously described manner.

Marking or cutting of the sheet 72 along an arc 86 of a circle is effected by placing the first guide member 17 against the edge 71 of the sheet at a location at which the pivot axis 35 of swivelable member 18 is at the center of curvature of the arc 86. Implement receiver 34 is drawn away from the guide members 17 and 18 until measuring tape 14 indicates that the arc 86 will have the desired radius. Referring to FIGS. 1 and 2, thumb wheel 59 is turned to clamp the tape 14 at swivelable member 18. Latch 73 is unlatched and disabled in the previously described manner. Referring again to FIG. 3, the arc 86 is then marked or cut by pivoting implement receiver 34 about pivot axis 35 while maintaining first guide member 17 stationary and maintaining tape 14 taut. The swivelable guide member 18 turns to accommodate to the pivoting movement.

Marking or cutting of arcs 86 can be facilitating by providing means for temporarily securing the first guide member 17 to the sheet of material 72 during the operation. This makes it unnecessary for the operator to hold the guide member 17 during the operation. Referring to FIG. 1, this embodiment of the invention has small holes 87 in the first arm 19 of first guide member 17 which may be used to temporarily fasten the guide member to a sheet of material by means of nails, screws or the like.

Additional holes 88 of this kind in the second arm 21 of the guide member enable fastening of the member to an edge of the sheet in instances where it desired not to disfigure the major surface of the sheet. In the preferred form, two of the additional holes 88 are present each being in proximity to a different end of the first guide member 17. The two holes 88 are equidistant from the midpoint of abutment surface 22 and are situated midway between the upper and lower edges of that surface. This enables scoring of identical arcs at precisely corresponding locations on the two opposite major surfaces of a sheet of material. This is effected by turning the sheet of material over after the arc has been scored on a first of the surfaces and then reattaching the first guide member 17 to the edge of the sheet using the same nail holes in the edge of the sheet that were used during scoring of the first arc. Scoring of arcs on both sides of some types of material, such as sheetrock for example, enables removal of arc shaped pieces without further cutting operations.

Referring to FIGS. 3 and 8, thumbscrew 62 may be turned to lock the swivelable guide member 18 at any selected angular orientation relative to the edge 71 of the sheet of material 72. If the first guide member 17 is then temporarily fastened to the sheet 72 in the previously described manner, the extended tape 14 may be used as a straight edge for drawing a linear line on the sheet that intersects the edge 71 at the selected angle.

While the invention has been described with reference to a single preferred embodiment for purposes of example, many modifications and variations are possible and it is not intended to limit the invention except as defined in the following claims.

I claim:

1. A tool guide for facilitating movement of an implement along a predetermined path of travel on a flat sheet of material, said tool guide having a tape measure which has a housing with a coiled measuring tape therein which tape has a distal end that may be drawn outward from the housing, said tool guide further having an implement receiver at said distal end of said measuring tape for maintaining said implement at a constant distance from said housing as said implement is moved along said path of travel, wherein the improvement comprises:

a first guide member having an abutment surface which may be abutted against an edge surface of said flat sheet of material in an orientation at which said abutment surface faces said edge surface and extends along said edge surface and extends at least partially across said edge surface, a swivelable guide member attached to said first guide member by a pivot which is oriented to enable pivoting of the swivelable guide member relative to the first guide member about a pivot axis which is perpendicular to said flat sheet of material when said first guide member is abutted against said edge surface thereof, said tape measure housing being secured to said swivelable member and being pivotable therewith.

2. The tool guide of claim 1 further including a releasable latch secured to said swivelable member and being located to engage with said first member when said abutment surface of said first member is abutted against said edge surface of said flat sheet of material and said swivelable member extends at right angles to said edge surface of said flat sheet of material.

3. The tool guide of claim 1 further including a turnable threaded screw engaged with one of said first guide member and said swivelable guide member and having an end positioned to bear against the other thereof when the screw is turned in a first angular direction whereby said swivelable guide member can be selectively immobilized relative to said first guide member at any of a plurality of different angular orientations relative thereto.

4. The tool guide of claim 1 further including means for selectively clamping said measuring tape to said swivelable guide member at a location which is outside said tape measure housing.

5. The tool guide of claim 1 further including means for temporarily securing said first guide member to said flat sheet of material.

6. The tool guide of claim 1 wherein said first guide member is penetrated by at least one fastener receiving hole which hole extends through said first guide member, said hole being located to be directed towards said flat sheet of material when said abutment surface of said first guide member is abutted against said edge surface of said flat sheet of material.

7. The tool guide of claim 1 wherein said first guide member is penetrated by at least a first and a second fastener receiving hole which holes extend through said first guide member, said first and second fastener receiving holes being at opposite sides of a midpoint of said abutment surface and being equidistant from said midpoint.

8. The tool guide of claim 1 wherein said swivelable guide member is an angled member having a base which faces said first guide member and having a wall portion which extends at right angles to said base, said tape measure housing being secured to said wall portion by a removable fastener that extends through a passage in said wall portion and which extends into said housing at a substantially centered location on a side wall of said housing.

9. The tool guide of claim 1 wherein said implement receiver has a slot into which an angled tab at said distal end of said measuring tape is entered, further including a releasable tape retainer secured to said implement receiver in position to hold the angled tab in said slot.

10. The tool guide of claim 1 wherein said implement receiver has a first opening sized for receiving a pencil and a second opening which is a slit sized for receiving a knife blade and which extends in transverse relationship to said measuring tape.

11. A tool guide for facilitating movement of an implement along a predetermined path of travel on a flat sheet of material, said tool guide having a tape measure which has a housing with a coiled measuring tape therein which tape has a distal end that may be drawn outward from the housing, said tool guide further having an implement receiver at said distal end of said measuring tape for maintaining said implement at a constant distance from said housing as said implement is moved along said path of travel, wherein the improvement comprises:

a first guide member having an abutment surface which may be contacted with an edge of said flat sheet of material, a swivelable guide member attached to said first guide member by a pivot which is oriented to enable pivoting of the swivelable guide member relative to the first guide member about a pivot axis which is perpendicular to said flat sheet of material when said first guide member is disposed against said edge thereof, wherein said pivot axis of said pivot is situated at said edge of said flat sheet of material when said first guide member abutment surface is abutted thereagainst, said tape measure housing being supported by said swivelable member and being pivotable therewith.

12. The tool guide of claim 11, wherein said tape measure housing has an opening through which said tape is drawn out of said housing, said housing being positioned to cause said tape to intersect said pivot axis at a point which is spaced apart from said opening.

13. The tool guide of claim 11 wherein said implement receiver positions an implement a predetermined distance away from said distal end of said measuring tape and wherein said housing opening is spaced from said pivot axis by a distance at least equal to said predetermined distance.

14. A tool guide for facilitating movement of an implement along a predetermined path of travel on a flat sheet of material, said tool guide having a tape measure which has a housing with a coiled measuring tape therein which tape has a distal end that may be drawn outward from the housing, said tool guide further having an implement receiver at said distal end of said measuring tape for maintaining said implement at a constant distance from said housing as said implement is moved along said path of travel, wherein the improvement comprises:

a first guide member having an abutment surface which may be abutted against an edge surface of said flat sheet of material in an orientation at which said abutment surface faces said edge surface and extends along said edge surface and extends at least partially across said end surface, a swivelable guide member attached to said first guide member by a pivot which is oriented to enable pivoting of the swivelable guide member relative to the first guide member about a pivot axis which is perpendicular to said flat sheet of material when said first guide member is abutted against said edge surface thereof, said tape measure housing being supported by said swivelable member and being pivotable therewith, wherein said implement receiver positions said implement at a location which is spaced outward from said distal end of said measuring tape and wherein said measuring tape has tape markings indicative of distance from said distal end thereof and wherein said swivelable guide member has a fixed marking situated adjacent to said tape at a location where the fixed marking registers with the one of said tape markings that corresponds to the distance of said implement from said pivot axis.

15. A tool guide for facilitating movement of an implement along a predetermined path of travel on a flat sheet of material, said tool guide having a tape measure which has a housing with a coiled measuring tape therein which tape has a distal end that may be drawn outward from the housing, said tool guide further having an implement receiver at said distal end of said measuring tape for maintaining said implement at a constant distance from said housing as said implement is moved along said path of travel, wherein the improvement comprises:

a first guide member having an abutment surface which may be abutted against an edge surface of said flat sheet of material in an orientation at which said abutment surface extends along said edge surface, wherein said first guide member is penetrated by at least a first and a second fastener receiving hole which holes extend through said first guide member, said first and second fastener receiving holes being at opposite sides of a midpoint of said abutment surface and being equidistant from said midpoint, wherein said abutment surface has upper and lower edges and wherein said first and second fastner receiving holes are centered between said upper and lower edges, a swivelable guide member attached to said first guide member by a pivot which is oriented to enable pivoting of the swivelable guide member relative to the first guide member about a pivot axis which is perpendicular to said flat sheet of material when said first guide member is abutted against said edge surface thereof, said tape measure housing being supported by said swivelable member and being pivotable therewith.

16. A tool guide for facilitating movements of an implement along linear paths of travel and along arcuate paths of travel on flat sheets of material, comprising:

an angled first guide member having a flat first arm for disposition against a marginal region of a major surface of a flat sheet of material and having a second arm with a flat abutment surface for abutment against an edge surface of the flat sheet of material which flat abutment surface extends at right angles to the first flat arm and wherein said flat abutment surface faces said edge surface and extends at least partially across said edge surface when said flat abutment surface is abutted against said edge surface, a swivelable guide member overlaying said first flat arm of said first guide member, a pivot axle coupling said first guide member and said swivelable guide member, said pivot axle having a pivot axis that extends at right angles to said flat first arm of said first guide member, a tape measure having a housing containing a measuring tape which has a distal end that may be drawn outward from the housing through an opening therein, said housing being secured to said swivelable guide member and being pivotable therewith, and an implement receiver engaging said distal end of said measuring tape and having at least one implement receiving opening.

17. The tool guide of claim 16 further including a tape clamp secured to said swivelable guide member in position to enable selective clamping of said measuring tape to said swivelable guide member, said tape clamp being spaced apart from said tape measure housing.

18. The apparatus of claim 16 further including means for selectively immobilizing said swivelable guide member relative to said first guide member at any of a plurality of different angular orientations relative thereto.

19. The apparatus of claim 16 wherein said implement receiving opening of said implement receiver is a slit sized to receive a knife blade and which extends transversely relative to said measuring tape.

20. A tool guide for facilitating movements of an implement along linear paths of travel and along arcuate paths of travel on flat sheets of material, comprising:

an angled first guide member having a flat first arm for disposition against a marginal region of a flat sheet of material and having a second arm with a flat abutment surface for abutment against an edge surface of the flat sheet of material which flat abutment surface extends at right angles to the first flat arm, wherein at least one first fastener receiving opening extends through said first flat arm of said first guide member and at least one second fastener receiving opening extends through said second arm thereof at said abutment surface of said second arm, a swivelable guide member overlaying said first flat arm of said first guide member, a pivot axle coupling said first guide member and said swivelable guide member, said pivot axle having a pivot axis that extends at right angles to said flat first arm of said first guide member, a tape measure having a housing containing a measuring tape which has a distal end that may be drawn outward from the housing through an opening therein, said housing being secured to said swivelable guide member and being pivotable therewith, and an implement receiver engaging said distal end of said measuring tape and having at least one implement receiving opening.

* * * * *